United States Patent
Mailloux et al.

(10) Patent No.: US 9,927,778 B2
(45) Date of Patent: Mar. 27, 2018

(54) METHOD AND SYSTEM FOR MANAGING POWER SHARING OF A PLURALITY OF CHARGING STATIONS SHARING THE SAME PORTION OF AN ELECTRICAL NETWORK

(71) Applicant: ADDENERGIE TECHNOLOGIES, INC., Quebec (CA)

(72) Inventors: Daniel Mailloux, Lac Beauport (CA); Louis Tremblay, Quebec (CA); Andre Garneau, Levis (CA)

(73) Assignee: ADDENERGIE TECHNOLOGIES INC., Quebec (CA)

( * ) Notice: Subject to any disclaimer, the term of this patent is extended or adjusted under 35 U.S.C. 154(b) by 469 days.

(21) Appl. No.: 14/543,156

(22) Filed: Nov. 17, 2014

(65) Prior Publication Data

US 2015/0346698 A1 Dec. 3, 2015

Related U.S. Application Data

(60) Provisional application No. 62/004,306, filed on May 29, 2014.

(51) Int. Cl.
| | |
|---|---|
| *H02J 3/14* | (2006.01) |
| *G05B 11/01* | (2006.01) |
| *B60L 11/18* | (2006.01) |
| *H02J 7/00* | (2006.01) |
| *G06Q 50/00* | (2012.01) |

(52) U.S. Cl.
CPC .......... *G05B 11/01* (2013.01); *B60L 11/1844* (2013.01); *B60L 11/1848* (2013.01); *G06Q 50/00* (2013.01); *H02J 7/007* (2013.01); *H02J 7/0013* (2013.01); *H02J 7/0027* (2013.01); *B60L 2230/40* (2013.01); *Y02E 60/721* (2013.01); *Y02T 10/7005* (2013.01); *Y02T 10/7088* (2013.01); *Y02T 90/121* (2013.01); *Y02T 90/128* (2013.01); *Y02T 90/14* (2013.01); *Y02T 90/163* (2013.01); *Y02T 90/168* (2013.01); *Y04S 10/126* (2013.01); *Y04S 30/12* (2013.01); *Y10T 307/406* (2015.04)

(58) Field of Classification Search
CPC ........ H02J 7/0013; H02J 7/0027; H02J 7/007; B60L 11/1848; G05B 11/01; Y10T 307/406
See application file for complete search history.

(56) References Cited

U.S. PATENT DOCUMENTS

| | | | | |
|---|---|---|---|---|
| 2010/0134067 A1* | 6/2010 | Baxter | ................. | B60L 3/0084 320/109 |
| 2011/0106329 A1* | 5/2011 | Donnelly | ................. | B60L 3/12 700/291 |

(Continued)

*Primary Examiner* — Carlos Amaya
*Assistant Examiner* — Esayas Yeshaw
(74) *Attorney, Agent, or Firm* — Christopher J. McKenna; Foley & Lardner LLP (57) ABSTRACT

A method and system are disclosed for managing power sharing of a plurality of charging stations sharing the same portion of an electrical network, the method comprising detecting an event at a charging station of the plurality of charging stations; determining if a charging configuration is acceptable with the event and if the charging configuration is not acceptable, modifying the charging configuration accordingly.

8 Claims, 6 Drawing Sheets

(56) References Cited

U.S. PATENT DOCUMENTS

| | | | | |
|---|---|---|---|---|
| 2011/0313603 | A1* | 12/2011 | Laberteaux | B60L 11/184 701/22 |
| 2012/0074893 | A1* | 3/2012 | Cole | H02J 7/35 320/101 |
| 2012/0109519 | A1* | 5/2012 | Uyeki | B60L 7/14 701/439 |
| 2012/0235646 | A1* | 9/2012 | Lo | H02J 7/0027 320/137 |
| 2013/0057210 | A1* | 3/2013 | Nergaard | B60L 1/003 320/109 |
| 2014/0012448 | A1* | 1/2014 | Tripathi | G05D 1/0276 701/22 |
| 2014/0129139 | A1* | 5/2014 | Ellison | G01C 21/3469 701/533 |
| 2014/0142770 | A1* | 5/2014 | Sellschopp | G06F 1/26 700/291 |
| 2014/0203077 | A1* | 7/2014 | Gadh | H02J 7/00 235/382 |
| 2016/0334234 | A1* | 11/2016 | Wild | G01C 21/3469 |

* cited by examiner

METHOD AND SYSTEM FOR MANAGING POWER SHARING OF A PLURALITY OF CHARGING STATIONS SHARING THE SAME PORTION OF AN ELECTRICAL NETWORK

CROSS-REFERENCE TO RELATED APPLICATION

The present application claims the benefit of U.S. Provisional Patent Application No. 62/004,306, filed on May 29, 2014, which is incorporated herein by reference in its entirety for all purposes.

FIELD

The present disclosure relates to electronics. More precisely, systems and methods of the present disclosure relate to managing power sharing of a plurality of charging stations sharing a same portion of an electrical network.

BACKGROUND

Providing charging stations for electric vehicles (EV) is very desirable.

The price of commercial intelligent public charging stations is usually considered to be quite high by potential customers.

The installation of non-intelligent public charging stations can also be costly for various reasons. A first reason is the cost of the wiring which has to be defined from the start depending on a final number of charging stations connected to the same portion of an electrical network.

Another reason is that the electrical system and the distribution panel are sized so that they are capable of accommodating the aggregated load of the ultimate number of charging stations that will be installed on the given portion of an electrical network. This cost might not be visible to the owner at the beginning, but there may be an impact to the electrical system and distribution panel as the number of charging stations exceeds two or three.

Thus, challenges may arise when managing power sharing.

BRIEF SUMMARY

According to one aspect there is disclosed a method for managing power sharing of a plurality of charging stations sharing a same portion of an electrical network, the method comprising detecting an event at a charging station of the plurality of charging stations; determining if a charging configuration is acceptable with the event and if the charging configuration is not acceptable, modifying the charging configuration accordingly.

In accordance with an embodiment of the method, the event is detected at a charging station of the plurality of charging stations.

In accordance with an embodiment of the method, the event is selected from a group comprising at least one of a connection of an electric vehicle to a given charging station of the plurality of charging stations; a disconnection of an electric vehicle to a given charging station of the plurality of charging stations; a request from an electric vehicle connected to a given charging station to start charging; an indication received from an electric vehicle connected to a given charging station that charging must stop since charging has been fully completed; and a change of a maximum current setting of an electric vehicle connected to a given charging station.

In accordance with an embodiment of the method, the determining if a charging configuration is acceptable with the event comprises obtaining an indication of a maximum power allowed on the portion of the electrical circuit network; obtaining an indication of a power consumed by the plurality of charging stations sharing the same portion of the electrical circuit; obtaining at least one criteria; checking if a charging configuration is acceptable.

In accordance with an embodiment of the method, the at least one criteria obtained comprises at least one condition associated with the charging configuration.

In accordance with an embodiment of the method, the indication of a power consumed by the plurality of charging stations of the electrical circuit is obtained over a given period of time.

In accordance with an embodiment of the method, the at least one criteria comprises a duration defining a length of a moving average for the power consumed by the plurality of charging stations sharing the same portion of the electrical circuit.

In accordance with an embodiment of the method, the modifying of the charging configuration comprises using an indication of a power available to provide and a list of a maximum power than can be delivered at any given charging station of the plurality of charging stations.

In accordance with an embodiment of the method, a priority list is obtained and the modifying of the charging configuration is performed using the priority list obtained, and a corresponding power to deliver to each charging station i is equal to $$\frac{X_i}{a_i}.$$

wherein P is the power available, $a_i$ is a corresponding priority such that $$P = \sum_{i=1}^{n} \frac{X_i}{a_i}.$$

In accordance with an embodiment of the method, the priority list obtained is established using a plurality of parameters.

In accordance with an embodiment of the method, the plurality of parameters is selected from a group comprising at least one of a user profile, a time of the day and a number of users connected.

In accordance with an embodiment of the method, the modifying of the charging configuration comprises providing the charging configuration to the plurality of charging stations.

In accordance with an aspect of the present disclosure, there is disclosed a controller for managing power sharing of a plurality of charging stations sharing a same portion of an electrical network, the controller comprising a charging station communication port operatively connected to a plurality of charging stations; a memory unit for storing an indication of a maximum power available and a charging station configuration; a processing unit operatively connected to the charging station communication port and to the memory unit, the processing unit for receiving an indication of an event at the plurality of charging stations from the charging station communication port, determining if a charging configuration is acceptable with the event, for modifying the charging configuration if it is not acceptable and for providing the modified charging configuration to the charging station communication port and to the memory unit.

In accordance with an embodiment, the event is selected from a group comprising at least one of a connection of an electric vehicle to a given charging station of the plurality of charging stations; a disconnection of an electric vehicle to a given charging station of the plurality of charging stations; a request from an electric vehicle connected to a given charging station to start charging; an indication received from an electric vehicle connected to a given charging station that charging must stop since charging has been fully completed and a change of a maximum current setting of an electric vehicle connected to a given charging station.

In accordance with an embodiment, the memory unit further comprises an indication of the current power consumed at the portion of the electrical network.

In accordance with an embodiment, the controller further comprises a data providing unit communication port connected to the processing unit; the data providing unit communication port for obtaining the indication of the current power consumed at the portion of the electrical network from a data providing unit and for storing the indication of the current power consumed at the portion of the electrical network in said memory unit.

In accordance with an embodiment, the controller further comprises a remote management unit communication port connected to the processing unit; the remote management unit communication port for obtaining the indication of a maximum power available allowed from a remote management unit and for storing the indication of a maximum power available in said memory unit.

In accordance with an embodiment, the charging station configuration comprises a set of parameters characterizing each of the plurality of charging stations.

In accordance with an embodiment, the set of parameters comprises a list of corresponding electrical power supplied to each charging station of the plurality of charging stations.

In accordance with an embodiment, the memory unit further comprises a priority list comprising a priority associated with each user of a corresponding charging station of the plurality of charging stations; the determining if a charging configuration is acceptable with the event and the modifying of the charging configuration are performed using the priority list, the indication of a maximum power available and the current power consumed at the portion of the electrical network.

BRIEF DESCRIPTION OF THE DRAWINGS

In order that the present disclosure may be readily understood, embodiments of the present disclosure are illustrated by way of example in the accompanying drawings.

Further details of the present disclosure and its advantages will be apparent from the detailed description included below.

DETAILED DESCRIPTION

In the following description of the embodiments, references to the accompanying drawings are by way of illustration of an example by which the present disclosure may be practiced.

Terms

The terms "including," "comprising" and variations thereof mean "including but not limited to," unless expressly specified otherwise.

The terms "a," "an" and "the" mean "one or more," unless expressly specified otherwise.

The term "plurality" means "two or more," unless expressly specified otherwise.

In some embodiments, a plurality of elements that share the same portion of an electrical network refers to the plurality of elements being located on the same branch circuit. In some embodiments, the plurality of elements sharing the same portion of the electrical network refers to the plurality of elements being connected to the same distribution panel. In some embodiments, the plurality of elements sharing the same portion of the electrical network refers to the plurality of elements being located at the same location. In some embodiments, the plurality of elements sharing the same portion of the electrical network refers to the plurality of elements being connected to the same distribution grid.

Neither the Title nor the Abstract is to be taken as limiting in any way the scope of the present disclosure. The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed subject matter is widely applicable to numerous embodiments, as is readily apparent from the disclosure. One of ordinary skill in the art will recognize that the disclosed subject matter may be practiced with various modifications and alterations, such as structural and logical modifications. Although particular features of the disclosed subject matter may be described with reference to one or more particular embodiments and/or drawings, it should be understood that such features are not limited to usage in the one or more particular embodiments or drawings with reference to which they are described, unless expressly specified otherwise.

With all this in mind, the present disclosure is directed to a method and system for managing power sharing of a plurality of charging stations sharing the same portion of an electrical network.

Figure 2:
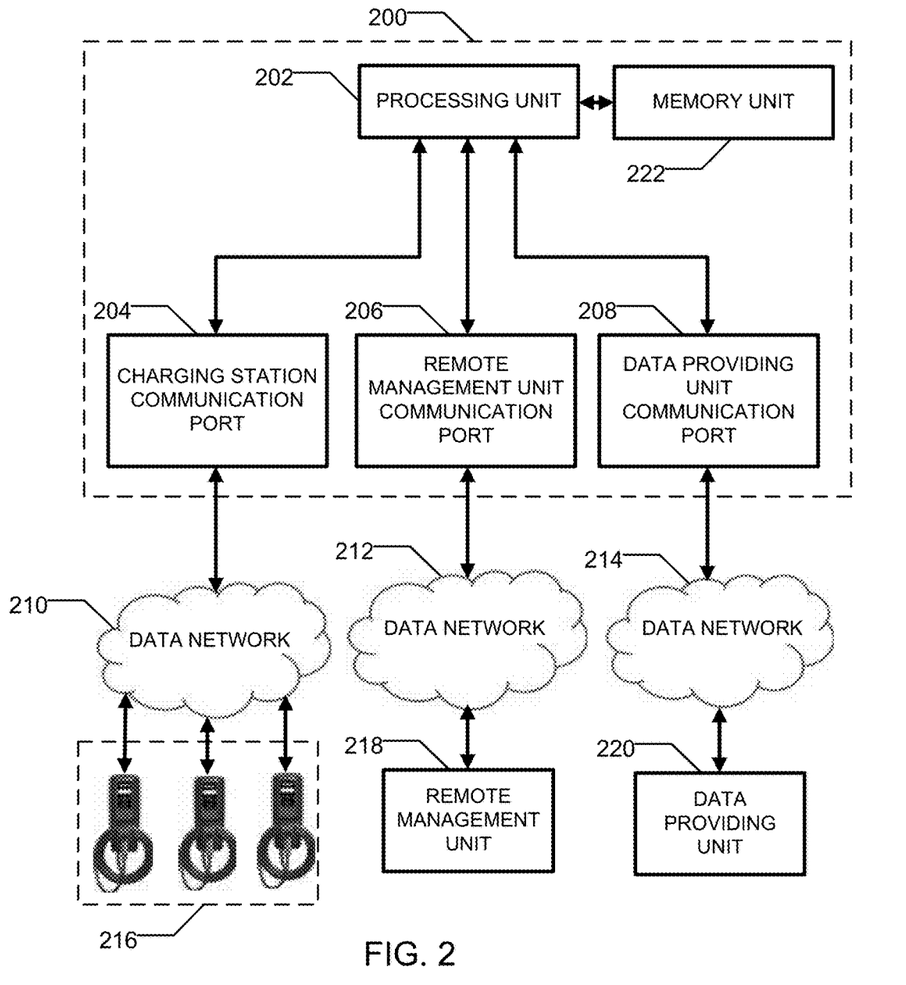
FIG. 2 is a block diagram which shows an embodiment of a system for managing power sharing of a plurality of charging stations sharing the same portion of an electrical network.

Now referring to FIG. 2, there is shown an embodiment of a system in which the method disclosed herein may be implemented.

In this embodiment, the system comprises a controller 200, a first data network 210, a second data network 206 and a third data network 208.

The system further comprises a plurality of charging stations 216, a remote management unit 218 and a data providing unit 220.

The plurality of charging stations 216 are used for providing electricity to an electric vehicle. It will be appreciated that a charging station may be of various types. In one embodiment, the charging station is the CoRe+ charging station manufactured by AddEnergie Technologies Inc. In one embodiment, the plurality of charging stations 216 operate according to the SAE J1772 standard.

The controller 200 is operatively connected to the plurality of charging stations 216 via the first data network 210.

The remote management unit 218 is used for optimizing the energy management of a building. The skilled addressee will appreciate that the remote management unit 218 may be of various types. In one embodiment, the remote management unit 218 is a building management system (BMS) manufactured by Delta Controls. Still in one embodiment, the remote management unit 218 can be accessed using the Building Automation and Control Networks (BACNet) protocol. The skilled addressee will appreciate that various embodiments may be provided.

The data providing unit 220 is used for providing data. It will be appreciated that the data may be of various types. In one embodiment, the data provided comprises electrical data provided by sensors. More precisely, the data providing unit 220 comprises at least one sensor for measuring current that can be accessed over a TED™ interface for instance. In some embodiments, the data providing unit 220 comprises a Measuring Transmitting Unit (MTU) PRO and at least one current transformer (CT), which may be manufactured by TED™. At least one current transformer can be used to read current measured at the main circuit breaker of the electric circuit supplying the portion of the electrical network. The skilled addressee will appreciate that the number of current transformers required depends on the electrical configuration of the electrical network.

As explained further below, it will be appreciated that the controller 200 is used for controlling the plurality of charging stations 216.

It will be further appreciated by the skilled addressee that the controller 200 may be of various types.

In the embodiment illustrated in FIG. 2, the controller 200 comprises a processing unit 202, a charging station communication port 204, a remote management unit communication port 206, a data providing unit communication port 208 and a memory unit 222.

The processing unit 202 is used for processing data and sharing data with the charging station communication port 204, with the remote management unit communication port 206, with the data providing unit communication port 208 and with the memory unit 222.

In one embodiment, the controller 200 is the ConnectPort X4 3G manufactured by Digi international.

The charging station communication port 204 can be used for sharing data between the controller 200 and the plurality of charging stations 216 via the first data network 210.

It will be appreciated by the skilled addressee that the charging station communication port 204 may be of various types. In one embodiment, the charging station communication port 204 is a Zigbee™ port; for example, when each charging station acts as a slave.

The remote management unit communication port 206 is used for sharing data between the controller 200 and the remote management unit 218 via the second data network 212.

It will be appreciated by the skilled addressee that the remote management unit communication port 206 may be of various types. In some embodiments, the remote management unit communication port 206 is an Ethernet port.

The data providing unit communication port 208 is used for sharing data between the controller 200 and the data providing unit 220 via the third data network 214.

It will be appreciated by the skilled addressee that the remote data providing unit communication port 208 may be of various types. In some embodiments, the remote data providing unit communication port 208 is an Ethernet port.

The memory unit 222 is used for storing data. It will be appreciated that the memory unit 222 may be of various types. In some embodiments, the memory unit 222 stores, inter alia, an application for managing power sharing of a plurality of charging stations sharing the same portion of an electrical network which when executed perform the method disclosed herein. More precisely, the memory unit 222 stores instructions which when executed cause the detecting of an event at a charging station of the plurality of charging stations. The memory unit 222 further stores instructions which when executed cause to determine if a charging configuration is acceptable with the event. The memory unit 222 further stores instructions which when executed cause the modifying of the charging configuration if the charging configuration is not acceptable.

The memory unit 222 may further store data that can be used for the purpose of executing the application for optimizing energy management of a plurality of charging stations sharing the same portion of an electrical network such as a priority list, an indication of the power consumed by the charging stations, an indication of a total energy power available not to exceed, a charging configuration, etc.

In some embodiments, the controller 200 may be accessed remotely. In some embodiments, the controller 200 is accessed by a remote processing unit, not shown. The remote processing unit may be used for managing the controller 200 from a remote location. The managing of the controller 200 may comprise sharing data with the controller 200. The remote processing unit may be also accessed over a data network, such as the Internet, by a user via a web interface. The remote processing unit may be used either by users or by a third party administering the system.

Figure 3:
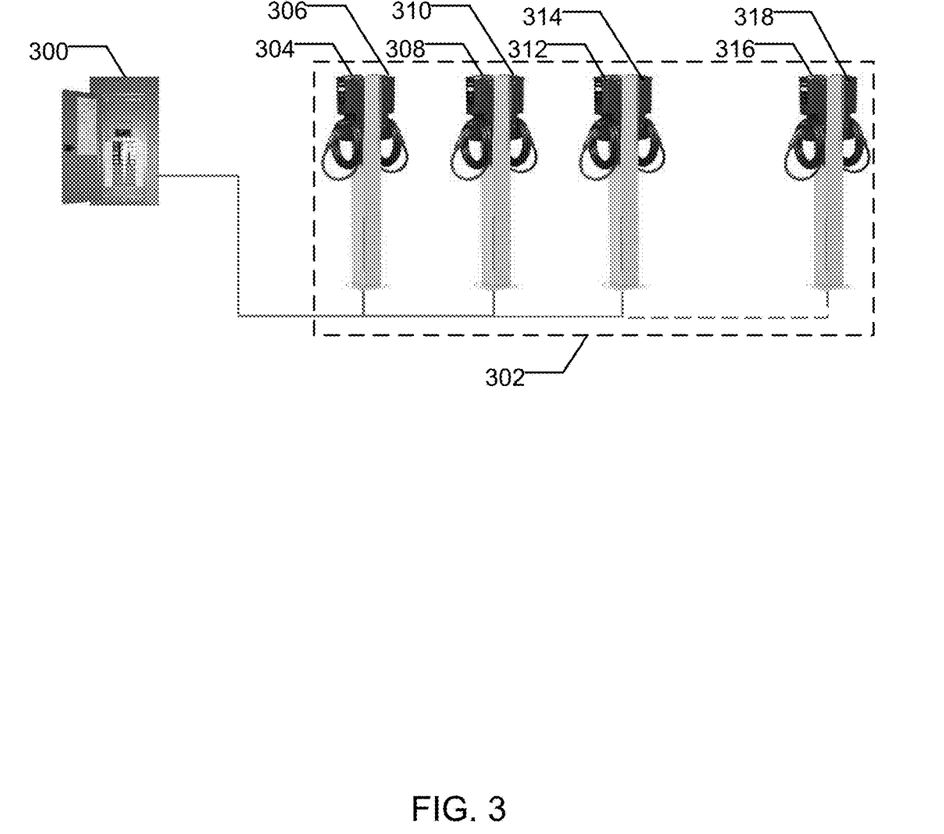
FIG. 3 is a block diagram which shows an embodiment illustrating a plurality of charging stations at a given location.

Now referring to FIG. 3, there is shown an embodiment of a system in which an electrical panel 300 is having a branch circuit operatively connected to a plurality of charging stations 302.

The plurality of charging stations can comprise a first charging station 304, a second charging station 306, a third charging station 308, a fourth charging station 310, a fifth charging station 312, a sixth charging station 314, a seventh charging station 316, and an eighth charging station 318.

Each of the first charging station 304, the second charging station 306, the third charging station 308, the fourth charging station 310, the fifth charging station 312, the sixth charging station 314, the seventh charging station 316, and the eighth charging station 318 can be the Core+ charging station manufactured by AddEnergie Technologies Inc. The plurality of charging stations 302 may be connected using various configurations, including, e.g., connected in a daisy chain fashion.

Figure 1:
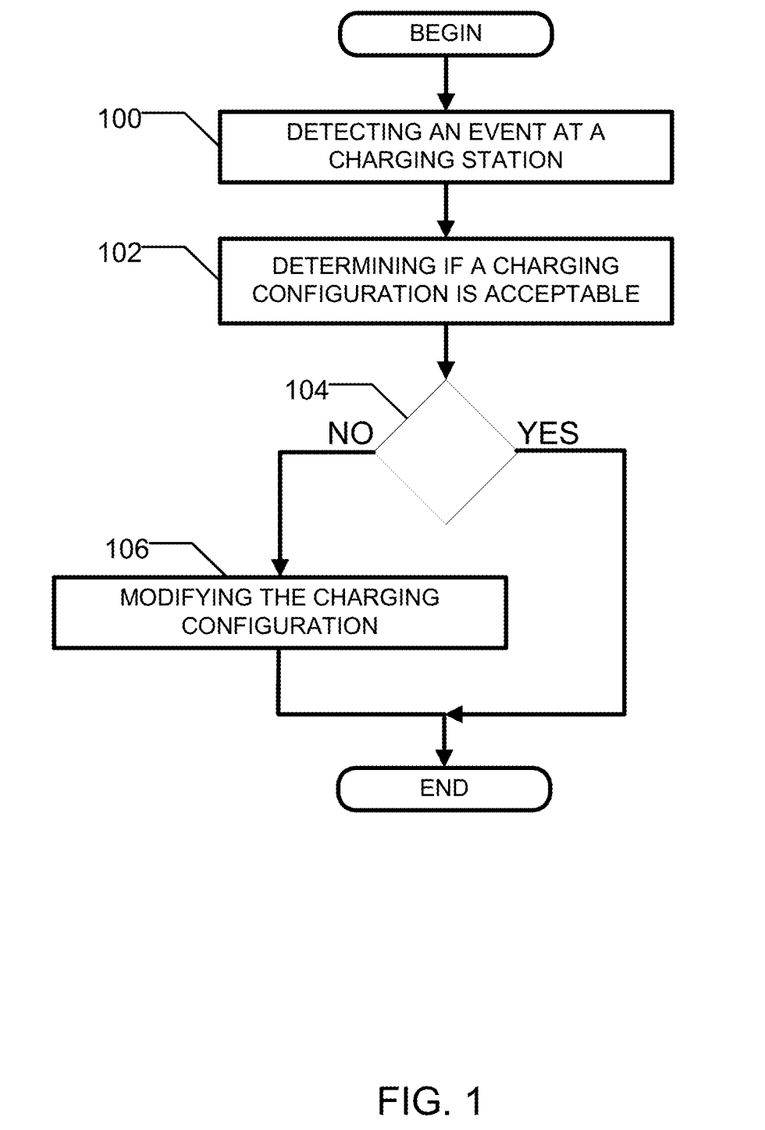
FIG. 1 is a flowchart which shows an embodiment of a method for managing power sharing of a plurality of charging stations sharing the same portion of an electrical network. According to a first processing step, an event is detected at a charging station. According to a second processing step, a test is performed in order to find out if a charging configuration is acceptable with the event; while according to a third processing step the charging configuration is modified if the charging schedule is not acceptable.

Now referring to FIG. 1 and according to processing step 100, an event is detected at a charging station of a plurality of charging stations.

It will be appreciated that the event may be one various types.

In one embodiment, the event is the connection of an electric vehicle to the charging station. It will be appreciated that for the purpose of the application, the connection of the electric vehicle to the charging station means the establishment of an electric connection between the electric vehicle and the charging station.

Now referring to FIG. 3 and for instance, the event may be that an electric vehicle is now connected to the first charging station 304.

In some embodiments, the event is the disconnection of an electric vehicle to the charging station. It will be appreciated that for the purpose of the application, the disconnection of the electric vehicle from the charging station means the end of an electric connection between the electric vehicle and the charging station. In the embodiment shown in FIG. 3, the event might be, in this case, that an electric vehicle, not shown, currently connected to the fifth charging station 312 disconnects from the fifth charging station 312.

In some embodiments, the event is the request from a connected electric vehicle to start charging. It will be appreciated that for the purpose of the application, the request to start charging of the electric vehicle from the charging station means the beginning of transfer of energy from the charging station to the electric vehicle. In the embodiment shown in FIG. 3, the event might be, in this case, that an electric vehicle, not shown, currently connected to the fifth charging station 312 start drawing power from the fifth charging station 312.

In some embodiments, the event is the indication from a connected electric vehicle that the energy transfer is to be stopped because a battery full charged has been reached. It will be appreciated that for the purpose of the application, the indication to stop charging of the electric vehicle to the charging station means the end of energy transfer. In the embodiment shown in FIG. 3, the event might be, in this case, that an electric vehicle, not shown, currently connected to the fifth charging station 312 stopped drawing power from the fifth charging station 312.

In some embodiments, the event is a change from the charging station of the maximum current setting the connected electric vehicle is allowed to draw while charging. It will be appreciated that for the purpose of the application, the request to change the maximum current setting of the electric vehicle from the charging station means that the power drawn from the electric vehicle should be brought equal or lower to this setting. In the embodiment shown in FIG. 3, the event might be, in this case, that an electric vehicle, not shown, currently connected to the fifth charging station 312 is drawing power from the fifth charging station 312.

Now referring back to FIG. 1 and according to processing step 102, a test is performed in order to find out if a charging configuration is acceptable.

It will be appreciated that the charging configuration may be referred to as a set of parameters that are characterizing the plurality of charging stations.

In some embodiments, the set of parameters comprises a list of corresponding electrical power currently supplied by each charging station of the plurality of charging stations. It will be appreciated that this list may be advantageously obtained from the memory unit 222. The set of parameters may also comprise a list of maximum electrical power that can be dispensed by each of the plurality of charging stations. It will be appreciated that the maximum electrical power that can be dispensed may change depending on a type of electric vehicle connected to a charging station.

The determination to find out if the charging configuration is acceptable may be performed according to various embodiments.

In some embodiments, the determination comprises determining if the charging configuration is such that the power demand exceeds a given value.

Figure 5:
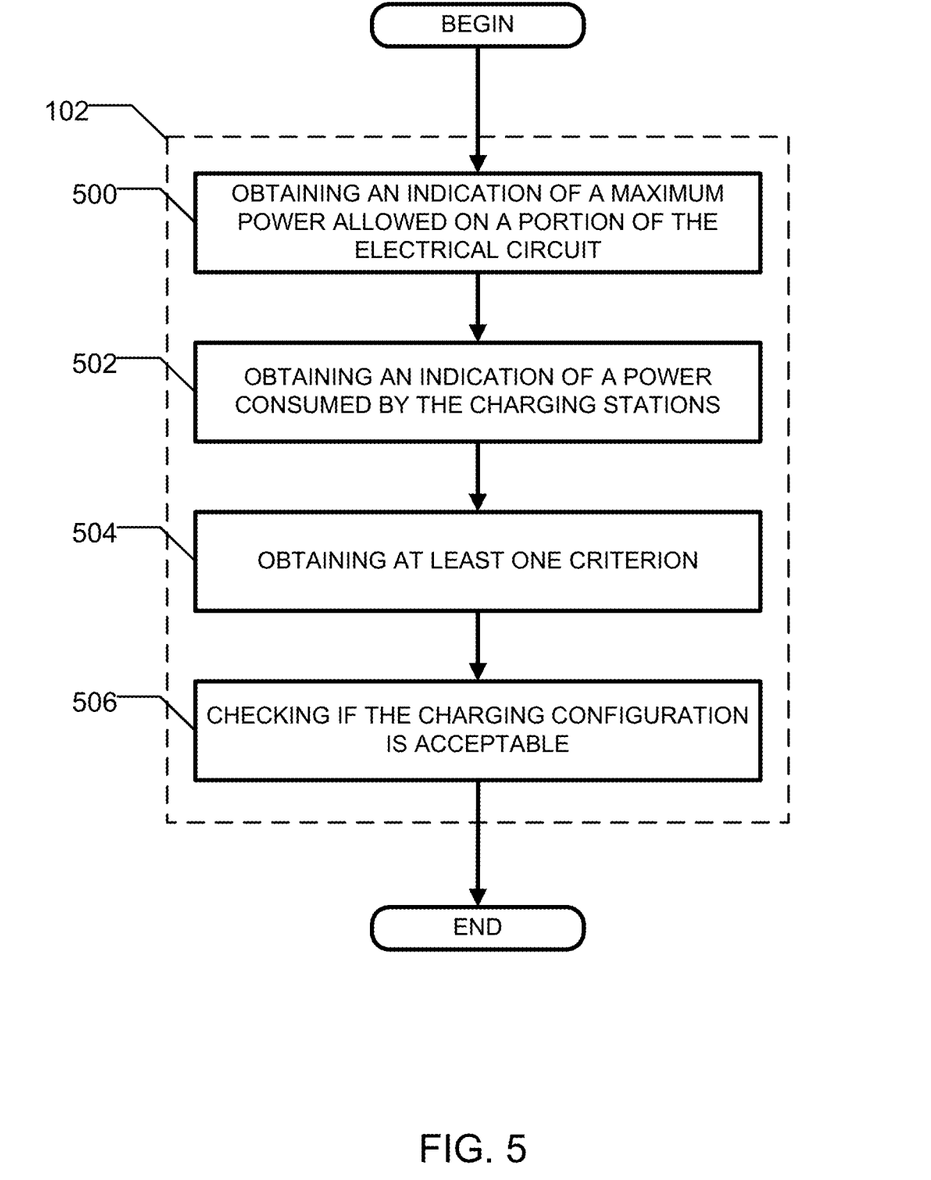
FIG. 5 is a flowchart which shows an embodiment for determining if a charging configuration is acceptable.

Now referring to FIG. 5, there is shown an embodiment for determining if a charging configuration is acceptable.

Figure 6:
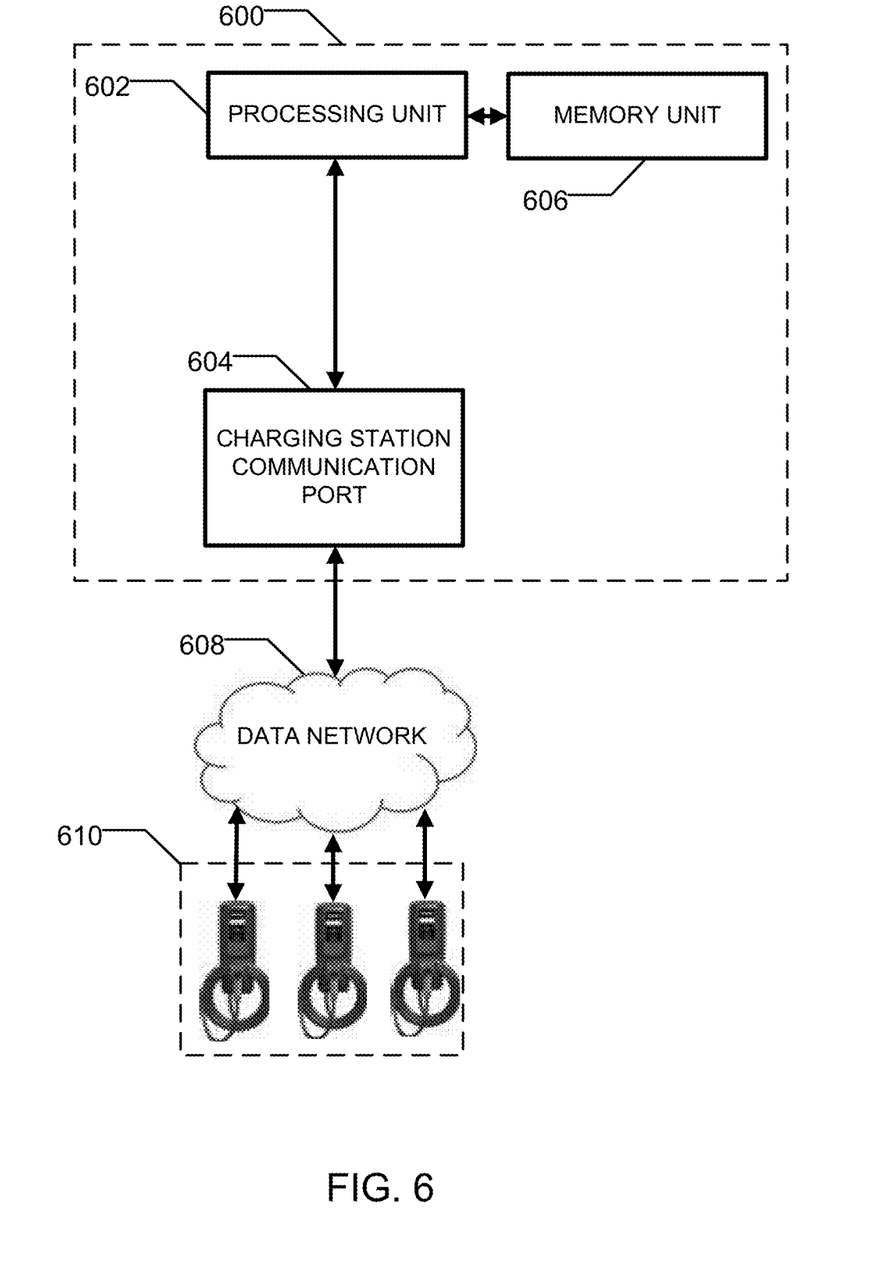
FIG. 6 is a block diagram which shows another embodiment of a system for managing power sharing of a plurality of charging stations sharing the same portion of an electrical network.

According to processing step 500, an indication of a maximum power allowed on the portion of the electrical circuit is obtained. In one embodiment, the indication of a maximum power allowed on the portion of the electrical circuit is read from the memory unit 606.

Now referring to FIG. 5 and according to processing step 502, an indication of a power consumed by the charging stations sharing the same portion of the electrical circuit is obtained. The indication of the power consumed by each charging station sharing the same portion of electrical circuit is obtained according to various embodiments.

Now referring to FIG. 6, there is shown an embodiment of a system for managing power sharing of a plurality of charging stations sharing the same portion of an electrical network.

In this embodiment, the controller 600 comprises a processing unit 602, a memory unit 606 and a charging station communication port 604.

The system further comprises a data network 608 and a plurality of charging stations 610.

It will be appreciated that the indication of the power consumed by each charging station sharing the same portion of electrical circuit is obtained by the processing unit 602 of the controller 600 from the plurality of charging stations 610 via data network 608.

It will be appreciated that in some embodiments, the indication of the power consumed by the charging stations is obtained at least every 12.5 sec. In some embodiments, the indication of the power consumed by the charging stations is stored in the memory unit 222.

The controller 600 may handle a plurality of portions of an electrical circuit. Each portion comprising a plurality of charging stations.

According to processing step 504, at least one criterion is obtained.

It will be appreciated that the criteria may be of various types. It will be appreciated that the criteria is at least one condition associated with the charging configuration. In some embodiments, the criteria comprises a duration defining the length of a moving average. In some embodiments the criteria is 15 mins.

According to processing step 506, a check is performed in order to find out if the charging configuration is acceptable. It will be appreciated that the check to determine if the charging configuration is acceptable is performed using data obtained over a period of time defined using the criteria provided. It will be therefore appreciated that the method disclosed herein is not time critical.

In the case where the charging configuration is not acceptable and according to processing step 106, the charging configuration is modified.

Figure 4:
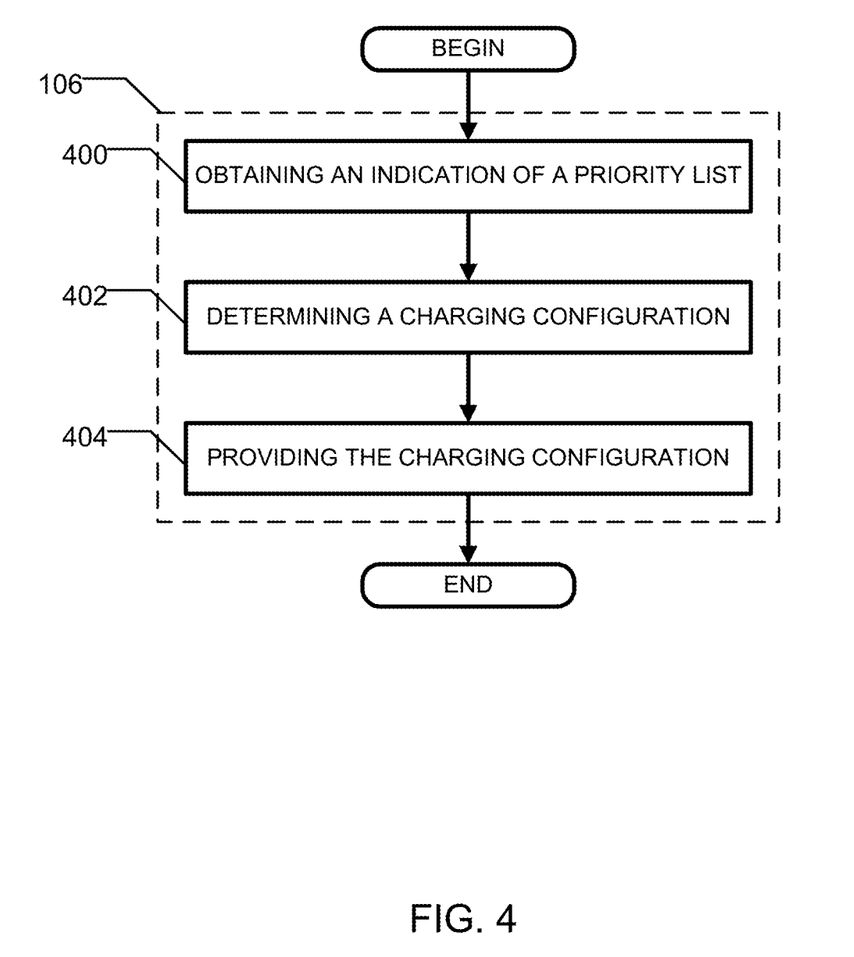
FIG. 4 is a flowchart which shows an embodiment for modifying the charging configuration.

Now referring to FIG. 4, there is shown an embodiment for modifying the charging configuration.

According to processing step 400, an indication of a priority list is obtained. It will be appreciated that this processing step is optional since in some embodiments all users may have the same priority.

It will be appreciated that the indication of a priority list may be obtained according to various embodiments.

In some embodiments, the indication of a priority list is obtained from the memory unit 222. It will be appreciated that the memory unit 222 may be populated with the priority list according to various embodiments.

In some embodiments, the priority list is obtained from a remote location, not shown.

According to processing step 402, a charging configuration is determined.

In some embodiments, the charging configuration is determined using the priority list, an indication of a power available to provide and a list of a maximum power than can delivered at any given charging station of the plurality of charging stations.

A user may be provided with a given priority. The priority may be established using a plurality of parameters. The parameters may be selected, for instance, from a group consisting of a user profile, a time of day, a number of users connected, etc. It will be appreciated that the priority may be static (e.g., not change over time) or dynamic (e.g., may change over time).

For instance, and in some embodiments, an owner of a condo unit in a condo building may have a higher priority in a charging station of the condo building than a guest visiting an individual at the condo building. An individual may be given a higher priority also based on the use of its electric vehicle, etc.

In some embodiments, the priority is a number ranging from 1 to 3, wherein 1 is the highest priority.

The charging configuration can be determined by solving the following equation:

$$P = \sum_{i=1}^{n} \frac{X_i}{a_i},$$

wherein P is the power available, i is an identification of a charging station of the plurality of stations, n is the number of charging stations, $a_i$ is a priority coefficient varying from 1 to 3 in one embodiment and $X_i$ is a variable to solve. In this embodiment, a priority coefficient of 1 may be referred to as an absolute priority, while a priority coefficient of 2 may be referred to as a high priority and a priority coefficient of 3 may be referred to as a regular priority. In some embodiments, the charging configuration is determined only for the charging stations that are supplying power, e.g. the identification of a charging station should be understood as the identification of an active charging station. Consequently, the power available P is split only between active charging stations. The skilled addressee will appreciate that this will optimize the management of the energy since only current consumption is taken into consideration.

The power to deliver to each charging station i is equal to $$\frac{X_i}{a_i}.$$

According to processing step 404, the charging configuration is provided.

It will be appreciated by the skilled addressee that the charging configuration may be provided according to various embodiments.

In some embodiments, the charging configuration is provided by the processing unit 602 to each of the plurality of charging stations via the charging station communication port 604 and the data network 608. It will be appreciated that the charging configuration is delivered by providing a signal to each charging station that will correspond to a determined value.

In one embodiment, the charging configuration is provided at the occurrence of every event or every 12.5 seconds whichever comes first.

It will be understood that the present disclosure in its broad aspect includes functional equivalents of the elements described herein.

The invention claimed is:

1. A method for managing power sharing of a plurality of charging stations sharing a same portion of an electrical network, the method comprising:

detecting an event at a charging station of the plurality of charging stations, wherein the event includes at least one of a connection of an electric vehicle to a given charging station of the plurality of charging stations, a disconnection of an electric vehicle to a given charging station of the plurality of charging stations, a request from an electric vehicle connected to a given charging station to start charging, an indication received from an electric vehicle connected to a given charging station that charging must stop since charging has been fully completed, or a change of a maximum current setting of an electric vehicle connected to a given charging station;

determining if a charging configuration is acceptable with the event, wherein determining if a charging configuration is acceptable with the event comprises obtaining an indication of a maximum power allowed on the portion of the electrical circuit network;

obtaining an indication of a power consumed by the plurality of charging stations sharing the same portion of the electrical circuit, and obtaining at least one criteria for acceptability, wherein the at least one criteria comprises a time duration over which a moving average is calculated for an aggregated power consumed by the plurality of charging stations sharing the same portion of the electrical circuit; and if the charging configuration is not acceptable, modifying the charging configuration accordingly, wherein the modifying of the charging configuration comprises using an indication of a power available to be delivered to the shared portion of the electrical network and a list of a maximum power that can be delivered at any given charging station of the plurality of charging stations, wherein a priority list is obtained, wherein the modifying of the charging configuration is performed using the priority list, and wherein a corresponding power to be delivered to each charging station i is equal to $$\frac{X_i}{a_i}$$

wherein P is the power available, $a_i$ is a corresponding priority such that $X_i$ is an amount of power defined such that $$P = \sum_{i=1}^{n} \frac{X_i}{a_i}.$$

2. The method as claimed in claim 1, wherein the at least one criteria obtained comprises at least one condition associated with the charging configuration.

3. The method as claimed in claim 1, wherein the indication of a power consumed by the plurality of charging stations of the electrical circuit is obtained over a given period of time.

4. The method as claimed in claim 1, wherein the priority list obtained is established using a plurality of parameters.

5. The method as claimed in claim 4, wherein the plurality of parameters is selected from a group comprising at least one of a user profile, a time of the day and a number of users connected.

6. A controller for managing power sharing of a plurality of charging stations sharing a same portion of an electrical network, the controller comprising:
a charging station communication port operatively connected to a plurality of charging stations;
a memory unit for storing an indication of a maximum power available a charging station configuration, and an indication of the current power consumed at the portion of the electrical network;
a processing unit operatively connected to the charging station communication port and to the memory unit, the processing unit for receiving an indication of an event at the plurality of charging stations from the charging station communication port, determining if a charging configuration is acceptable with the event, for modifying the charging configuration if it is not acceptable and for providing the modified charging configuration to the charging station communication port and to the memory unit, wherein the charging station configuration comprises a set of parameters characterizing each of the plurality of charging stations,
wherein the event includes at least one of connection of an electric vehicle to a given charging station of the plurality of charging stations, a disconnection of an electric vehicle to a given charging station of the plurality of charging stations, a request from an electric vehicle connected to a given charging station to start charging, an indication received from an electric vehicle connected to a given charging station that charging must stop since charging has been fully completed and a change of a maximum current setting of an electric vehicle connected to a given charging station,
wherein the memory unit further comprises a priority list comprising a priority associated with each user of a corresponding charging station of the plurality of charging stations, wherein the determining if the charging configuration is acceptable with the event and the modifying of the charging configuration are performed using the priority list, the indication of a maximum power available and the current power consumed at the portion of the electrical network, and wherein a corresponding power to deliver to each charging station i is equal to $$\frac{X_i}{a_i}$$

where P is the power available, $a_i$ is the corresponding priority such that $X_i$ is an amount of power defined such that $$P = \sum_{i=1}^{n} \frac{X_i}{a_i}.$$

7. The controller as claimed in claim 6, further comprising a data providing unit communication port connected to the processing unit; the data providing unit communication port for obtaining the indication of the current power consumed at the portion of the electrical network from a data providing unit and for storing the indication of the current power consumed at the portion of the electrical network in said memory unit.

8. The controller as claimed in claim 6, further comprising a remote management unit communication port connected to the processing unit; the remote management unit communication port for obtaining the indication of a maximum power available allowed from a remote management unit and for storing the indication of a maximum power available in said memory unit.

* * * * *

UNITED STATES PATENT AND TRADEMARK OFFICE
CERTIFICATE OF CORRECTION

PATENT NO. : 9,927,778 B2
APPLICATION NO. : 14/543156
DATED : March 27, 2018
INVENTOR(S) : Mailloux et al.

Page 1 of 1

It is certified that error appears in the above-identified patent and that said Letters Patent is hereby corrected as shown below:

In the Specification

Column 2, Line 37, delete "$X_i$" and insert --$X$--.

Column 2, Line 44, delete "$X_i$" and insert --$X$--.

Column 9, Line 43, delete "$X_i$" and insert --$X$--.

Column 9, Line 63, delete "$X_i$" and insert --$X$--.

In the Claims

Claim 1, Column 10, Line 62, delete "$X_i$" and insert --$X$--.

Claim 1, Column 11, Line 3, delete "$X_i$" and insert --$X$--.

Claim 6, Column 12, Line 19, delete "$X_i$" and insert --$X$--.

Claim 6, Column 12, Line 27, delete "$X_i$" and insert --$X$--.

Signed and Sealed this
Seventh Day of June, 2022

Katherine Kelly Vidal
*Director of the United States Patent and Trademark Office*